3,308,227
PROCESS FOR MAKING EMBOSSED LAMINATES
George Edward Power, Wyoming, and Paul Nicholas Valerius, Cincinnati, Ohio, assignors to Formica Corporation, Cincinnati, Ohio, a corporation of Delaware
No Drawing. Filed Apr. 20, 1964, Ser. No. 361,226
6 Claims. (Cl. 264—284)

This invention relates to a novel process for embossing the decorative surface of a substantially completely cured thermoset synthetic resin laminate by subjecting said laminate to certain elevated temperatures and pressures by an embossing element for a sufficient period of time to achieve the desired effect.

One of the objects of the present invention is to produce an embossed effect on the decorative surface of a substantially completely cured thermoset synthetic resin laminate. A further object of the present invention is to provide a process whereby the embossed effects can be imparted to the decorative surface of a laminate after the laminate has been substantially completely cured at least on its surface which contains a thermoset synthetic resinous material. These and other objects of the present invention will be discussed in greater detail hereinbelow.

Decorative laminates are well-known articles of commerce which have been produced for a substantial plurality of years and find utility in counter tops, tables, vertical wall surfaces among many others. These decorative laminates are prepared by assembling a plurality of phenolic resin impregnated kraft paper sheets generally numbering about 3–9 onto which is placed a print sheet which has been impregnated with a nobler resin. These noble resins are thermosetting resinous compositions that are well known for their light color, hardness, mar resistance, and the like. Among these noble resins which are generally used to impregnate the print sheet are the aminotriazine resins and, more particularly, the melamine formaldehyde resins, the unsaturated polyester resins, the epoxy resins, the urea formaldehyde resins, diallyl phthalate cross-linked resins and the like. As a matter of practice, there is generally superimposed on the print sheet an overlay sheet which is a foil of fine paper, which when impregnated with a noble thermosetting resinous composition develops a significant measure of transparency and in ultimate use becomes a transparent sheet which becomes bonded to the entire structure through its direct contact with the impregnated print sheet thereby forming a unitary structure with the phenolic resin impregnated kraft sheets.

The instant process is also applicable to phenolic resin laminates, i.e. those laminates which have a thermoset phenolic resin decorative surface. These laminates ordinarily have a black glossy appearance but by the present process the surface is embossed to a less reflective appearance.

In producing these decorative laminates, one generally will make use of a highly polished press plate which imparts its mirror-like reflection to the decorative surface of the laminated article. For many years these highly glossy surfaces were in full vogue and were readily acceptable. However, as fashion tastes change, there has seemingly developed currently, a trend toward a dull or satiny finish or a "brush" finish.

The satin finish laminate has essentially a single level or planer surface while the textured or "brush" finish laminate have an irregular or multi-leveled surface. The textured finishes may be designed to have desirable decorative effects or they may be designed only for the elimination of glare i.e. light reflection. The degree of dullness or lack of gloss is seemingly a personal choice factor and varies from individual to individual in much the same manner that a particular color or pattern will be suitable for one individual whereas a different color or pattern would be the choice of some other person. The decorative laminates are prepared in a very substantial plurality of patterns and colors and designs and, as a consequence, it can readily be seen that even with only one surface finish, a very substantial inventory of these different patterns would need to be maintained in a plurality of different warehouses awaiting distribution ultimately to the trade. If, additionally, one were required to maintain a substantial plurality of different textured surfaces on each of the individual designs, colors and patterns of the laminates, the total inventory would be vastly multiplied. In the past, when a dull or satin finish was required in a laminate, one had a choice of a plurality of techniques. For instance, one could use a straight forward mechanical dulling with an abrasive material by either a wet or dry process to obtain a dull or satin finish. Alternatively one could utilize a specifically designed press plate that lacked the usual measure of high gloss conventionally utilized in routine laminating, so as to impart to the decorative surface a finish of diminished reflection. This step of producing such a laminate was accomplished during the heat and pressure consolidation step inasmuch as it was believed prior to the instant invention that a substantially sufficiently cured thermosetting resin surface could not be altered after the heat and pressure consolidation step had been accomplished. This technique although to some extent satisfactorily acceptable, could only be accomplished on custom orders and no inventory could be maintained. A further shortcoming of one of the former and prior art techniques of producing decorative laminates with embossed surfaces, resides in the fact that the press plates, that were used to give the dull surface finish, required constant maintenance for one particular surface effect and a substantial plurality of different press plates would be required where surfaces of different degrees of reflection were in demand.

The present invention surprisingly accomplishes a result that not only was unpredictable, but those skilled in the art had already predicted that an embossed effect could not be imparted to the surface of a decorative laminate which had already been substantially completely cured, i.e. converted from the thermosetting to the thermoset state. It was known that thermoplastic surfaces could be embossed, but thermoplastic materials do not cure by virtue of their very definition and, as a consequence, are capable of being re-softened upon the application of heat. This is known not to be true of thermosetting materials that have been cured to a substantially completely cured thermoset condition. The instant applicants then, almost out of sheer curiosity, tried the application of certain specific pressures and elevated temperatures to a sufficiently cured thermosetting resin decorative laminate, and were surprised to find that an embossed effect could be imparted at the surface notwithstanding the fact that that surface was a substantially completely cured thermoset resinous material.

In the practice of the process of the present invention, one will pass the decorative surface of a thermoset synthetic resin laminate through a pair of pressure imparting elements, one of which has an embossed surface, so that the element with the embossed effect thereon, will come in direct physical contact with the decorative thermoset surface of the laminate.

These pressure imparting or exerting elements may be in the nature of rollers or continuous flexible steel belts and as used sometimes hereinbelow, these terms are to be interpreted interchangeably.

The amount of pressure exerted between these elements onto the laminate may be varied from about 1000 to about 4000 pounds per lineal inch along the line of contact of the embossing rolls. The movement of the laminate through the pressure elements is controlled at a speed between about one-half foot per minute to about 20 feet per minute. The movement of the laminate through these elements is maintained at a speed substantially identical with the speed of the movement of the elements. Otherwise, a greater or lesser speed of movement of the laminate through the elements, as contrasted with the speed of the elements would defeat the purposes of the present invention inasmuch as a calendering effect would be imparted which would tend to increase reflection rather than to diminish it, and if done uniformly, would not produce the surfaces of diminished reflection desired. The temperature of the rolls and particularly the embossing roll, is controlled between about 225° C. and 375° C. It is not imperative that the backup roll be heated at all and, in fact, may be maintained at room temperature except for the measure of heat that is imparted thereto indirectly from the heated embossing roll. When the backup roll is thus maintained, it is observed that there is sometimes a tendency to warp the ultimate laminate, and for that reason the warping can be avoided by heating the backup roll. In heating the backup roll, the roll should be maintained at a temperature which is very close to the temperature of the embossing roll although some departures from this rule of thumb may be tolerated such as, by heating the backup roll to a temperature not more than 75° C. cooler than the embossing roll. The embossing roll may be prepared by any one of a substantial number of known techniques for producing embossing rolls such as, sand blasting and the like. These embossing rolls are available from a substantial plurality of commercial sources and, as a consequence, specific details relating to the manufacture and characteristics of the embossing rolls need not be explored here.

Similarly, if pairs of flexible stainless steel belts are to be used as the pressure exerting elements, these belts can also be acquired commercially and the embossing of the belts can be accomplished by known techniques.

The depth to which the embossing effect is imparted to the surface of the laminate will depend in significant measure, on the extent of diminished reflection desired in the ultimate laminates. As a consequence, it is not imperative that there be any limitation on the depth of embossing on the emboss roll or belt nor the depth of embossing imparted to the surface of the laminate. For practical purposes, however, this depth of embossing imparted to the surface of the laminate may be varied between about 0.0005" and 0.005".

In order that the concept of the present invention may be more completely understood, the following examples are set forth. These examples are set forth primarily for the purpose of illustration and any specific enumeration of detail contained therein should not be interpreted as a limitation on the case, except as is indicated in the appended claims.

*Example 1*

A plurality of glossy decorative laminates are prepared, each having as the core, eight phenolic resin impregnated kraft paper sheets, a melamine formaldehyde resin print sheet and a melamine formaldehyde resin overlay sheet, heat and pressure consolidated to a unitary structure. These laminates are then embossed by passing them through the nip between two metallic rolls. The roll which contacts the decorative face is finished with No. 80 grit ground surface. Using a roll speed of 3.5 ft. per minute, a temperature of 300° C. and an applied force of 2653 lbs. per inch width, an embossment of the decorative laminate surface was readily achieved which had a gloss lengthwise of 16–18 and crosswise of 7–8. A brush plate finish on a comparable decorative laminate had a gloss lengthwise of 22–17 and crosswise of 5–5.

*Example 2*

Example 1 is repeated in substantially all details except that the roll speed is 5 ft. per minute. The gloss lengthwise is 18–17 and 9–8 crosswise.

*Example 3*

A plurality of laminates comparable to those used in Example 1 were passed through the metallic rolls at a constant speed of 3.5 ft. per minute and an applied force of 2653 lbs. per inch width, while varying the temperature. The temperature in one instance was 250° C., in another instance was 275° C., whereas in the third run, the temperature was 300° C. The results of the treatment are shown hereinbelow in Table I.

TABLE I

| Temperature, °C. | Speed, f.p.m. | Force, lbs./in. | Gloss | |
|---|---|---|---|---|
| | | | Lengthwise | Crosswise |
| 250 | 3.5 | 2,653 | 42–40 | 20–20 |
| 275 | 3.5 | 2,653 | 32–30 | 14–12 |
| 300 | 3.5 | 2,653 | 16–17 | 7–8 |
| Molded Brush Plate Finish | | | 22–17 | 5–5 |

*Example 4*

Example 3 is repeated in substantially all details except that the temperature was held constant at 300° C. in each instance. The speed was held constant at 3.5 ft. per minute whereas the force was varied as is shown in Table II hereinbelow.

TABLE II

| Force, lbs./in. | Speed, f.p.m. | Temperature, °C. | Gloss | |
|---|---|---|---|---|
| | | | Lengthwise | Crosswise |
| 1,327 | 3.5 | 300 | 24–25 | 10–10 |
| 1,592 | 3.5 | 300 | 21–19 | 10–10 |
| 1,990 | 3.5 | 300 | 18–17 | 8–8 |
| 2,653 | 3.5 | 300 | 16–17 | 7–8 |
| Molded Brush Plate Finish | | | 22–17 | 5–5 |

The gloss readings referred to hereinabove as lengthwise and crosswise refer to the particular pattern which is used for embossing consisting of a series of lengthwise scratches or grooves that are produced by grinding the surface of the embossing roll. The gloss parallel to the scratches is different from that observed in the perpendicular direction. The lengthwise gloss is obtained when the observer looks along an axis parallel to the grooves whereas the crosswise value is obtained by looking at right angles to this direction.

*Example 5*

Example 1 is repeated in substantially all details except that the print sheet is a cellulosic fibrous sheet impregnated with an epoxy resin and the overlay sheet is also impregnated with an epoxy resin. Comparable results were achieved.

*Example 6*

Example 1 is repeated in substantially all details except that no print sheet is used but the surface decorative sheet is impregnated with a phenolic resin. Again comparable results were achieved.

*Example 7*

Example 1 is repeated in substantially all details except that the print sheet and the overlay sheet are each impregnated with a polymer of diallyl phthalate which is converted to the thermoset state by cross-linking prior to the treatment in the embossing step. Again comparable results were achieved.

*Example 8*

Example 1 is repeated in substantially all details except that the print sheet and the overlay sheet are each impregnated with a urea formaldehyde resin. Again comparable results were achieved.

We claim:

1. A process for embossing the decorative surface of a substantially completely cured thermoset synthetic resin laminate comprising passing said laminate through a pair of pressure imparting elements, one of which has an embossed surface, at a speed between about one-half foot per minute to about 20 feet per minute, under a pressure of from about 1,000 to about 4,000 pounds per lineal inch, along the line of contact of said elements, while maintaining a temperature in said elements from about 225° C. to about 375° C., wherein the embossed surface of said pressure imparting element is brought into direct physical contact with the decorative surface being embossed and wherein the depth of embossing imparted to the decorative surface of the laminate varies between about 0.0005" and 0.005".

2. A process for embossing the decorative surface of a substantially completely cured thermoset synethtic resin laminate comprising passing said laminate through a pair of pressure imparting rolls, one of which has an embossed surface, at a speed between about ½ ft. per minute to about 20 ft. per minute under a pressure from about 1,000 to about 4,000 lbs. per lineal inch, along the line of contact of said rolls while maintaining a temperature in said rolls from about 225° C. to about 375° C., wherein the embossed surface of said pressure imparting roll is brought into direct physical contact with the decorative surface being embossed and wherein the depth of embossing imparted to the decorative surface of the laminate varies between about 0.0005" and 0.005".

3. A process for embossing the decorative surface of a substantially completely cured thermoset synthetic resin laminate comprising passing said laminate through a pair of pressure imparting rolls, one of which has an embossed surface, at a speed between about ½ ft. per minute to about 20 ft. per minute under a pressure from about 1,000 to about 4,000 lbs. per lineal inch, along the line of contact of said rolls while maintaining a temperature in said rolls from about 225° C. to about 375° C., wherein the embossed surface of said pressure imparting roll is brought into direct physical contact with the decorative surface being embossed, wherein the depth of embossing imparted to the decorative surface of the laminate varies between about 0.0005" and 0.005" and wherein said decorative surface is comprised of a thermoset melamine formaldehyde resin.

4. A process for embossing the decorative surface of a substantially completely cured thermoset synthetic resin laminate comprising passing said laminate through a pair of pressure imparting rolls, one of which has an embossed surface, at a speed between about ½ ft. per minute to about 20 ft. per minute under a pressure from about 1,000 to about 4,000 lbs. per lineal inch, along the line of contact of said rolls while maintaining a temperature in said rolls from about 225° C. to about 375° C., wherein the embossed surface of said pressure imparting roll is brought into direct physical contact with the decorative surface being embossed, wherein the depth of embossing imparted to the decorative surface of the laminate varies between about 0.0005" and 0.005" and wherein said decorative surface is comprised of a thermoset epoxy resin.

5. A process for embossing the decoative surface of a substantially completely cured thermoset synthetic resin laminate comprising passing said laminate through a pair of pressure imparting rolls, one of which has an embossed surface, at a speed between about ½ ft. per minute to about 20 ft. per minute under a pressure from about 1,000 to about 4,000 lbs. per lineal inch, along the line of contact of said rolls while maintaining a temperature in said rolls from about 225° C. to about 375° C., wherein the embossed surface of said pressure imparting roll is brought into direct physical contact with the decorative surface being embossed, wherein the depth of embossing imparted to the decorative surface of the laminate varies between about 0.0005" and 0.005" and wherein said decorative surface is comprised of a thermoset diallyl phthalate resin.

6. A process for embossing the decorative surface of a substantially completely cured thermoset synthetic resin laminate comprising passing said laminate through a pair of pressure imparting rolls, one of which has an embossed surface, at a speed between about ½ ft. per minute to about 20 ft. per minute under a pressure from about 1,000 to about 4,000 lbs. per lineal inch, along the line of contact of said rolls while maintaining a temperature in said rolls from about 225° C. to about 375° C., wherein the embossed surface of said pressure imparting roll is brought into direct physical contact with the decorative surface being embossed, wherein the depth of embossing imparted to the decorative surface of the laminate varies between about 0.0005" and 0.005" and wherein said decorative surface is comprised of a thermoset phenolic resin.

References Cited by the Examiner

UNITED STATES PATENTS

| | | | |
|---|---|---|---|
| 1,999,384 | 4/1935 | Woodall | 156—220 |
| 2,024,007 | 11/1935 | McCollock | 161 |
| 3,040,799 | 6/1962 | Hanson | 161 |
| 3,198,688 | 8/1865 | Yodor | 161 |

ROBERT F. WHITE, *Primary Examiner.*

R. KUCIA, *Assistant Examiner.*